Feb. 20, 1951   H. ZIEBOLZ   2,542,787
STABILIZED SERVOMOTOR CONTROL SYSTEM
Filed May 22, 1946   2 Sheets-Sheet 1

INVENTOR.
Herbert Ziebolz,
BY
Attys.

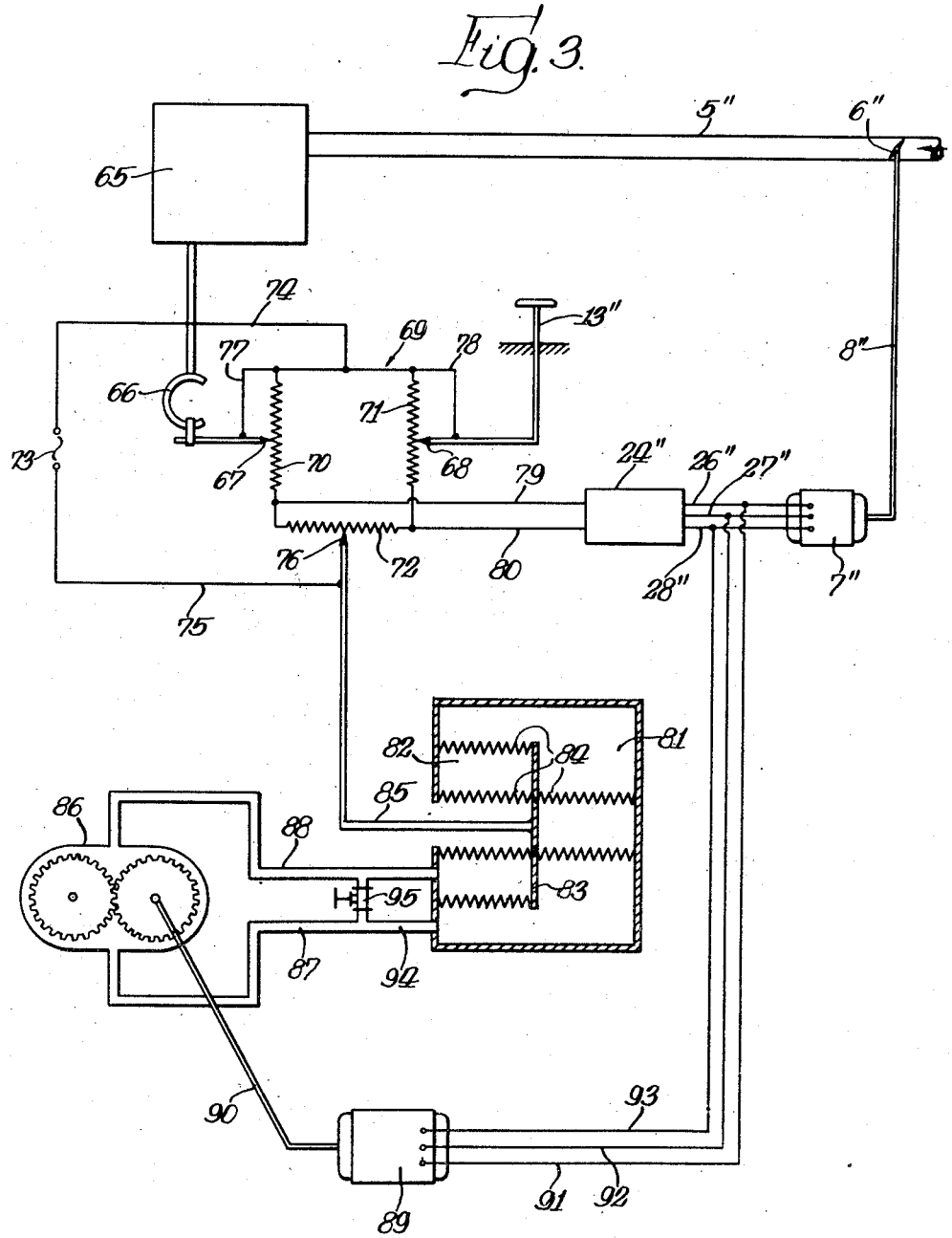

Patented Feb. 20, 1951

2,542,787

UNITED STATES PATENT OFFICE 2,542,787

STABILIZED SERVOMOTOR CONTROL SYSTEM

Herbert Ziebolz, Chicago, Ill., assignor to Askania Regulator Company, Chicago, Ill., a corporation of Illinois Application May 22, 1946, Serial No. 671,543

4 Claims. (Cl. 318—29)

1

The invention relates to systems for the control of a condition such as flow, pressure, temperature, and the like, and has as a general object to perfect new and improved and, particularly, stabilized systems of that character.

In all condition control systems instability, caused primarily by hunting due to overadjustment, is a factor sought to be eliminated. Because of the impossibility of completely eliminating some time lag between the call for adjustment of a condition and the reflection of change in the condition, by adjustment of the condition control means, upon the means calling for the adjustment, avoidance of hunting is customarily sought by offsetting to a greater or lesser degree the call for adjustment of the condition by means activated as an incident to adjustment of the condition.

It is another object of this invention, therefore, to provide new and improved means for offsetting the call for adjustment of the condition after an appropriate adjustment of the condition-controlling means has been made.

A further object is to provide a new and improved means for offsetting the call for adjustment of the condition which means operates as a function of the length of time that the condition-controlling means is being adjusted.

Still a further object is to provide a control system having means responsive to the condition to be controlled and operable to set up a call for correction of the condition upon departure of the condition from the value sought to be maintained and differential pressure-actuated means controlled as a function of the time of correction of the condition operable to offset the call for correction.

Still a further object is to provide a control system having means responsive to the condition to be controlled and operable to set up a call for correction of the condition upon departure of the condition from the value sought to be maintained, differential pressure actuated means controlled as a function of the time of correction of the condition operable to offset the call for correction, and means for equalizing the pressure to remove the effect of the offsetting means.

Other objects and advantages will become apparent from the following detailed description taken in connection with the accompanying drawings, in which.

Figure 1:
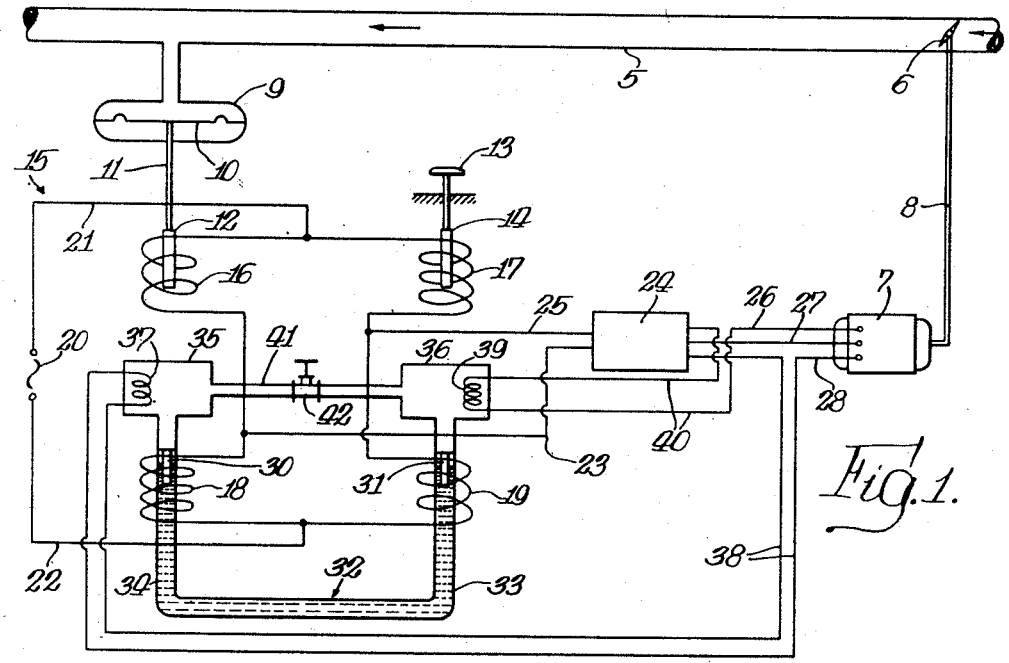
Fig. 1 is a diagrammatic illustration of a control system embodying the features of my invention.

2 fied form of control system embodying the features of my invention.

Fig. 3 is a diagrammatic illustration of still another modified form of control system embodying the features of my invention.

While the invention is susceptible of various modifications and alternative constructions, it is shown in the drawings and will hereinafter be described in three embodiments. It is not intended, however, that the invention is to be limited thereby to the specific constructions shown. On the contrary, it is intended to cover all modifications and alternative constructions falling within the spirit and scope of the invention as defined in the appended claims.

Speaking generally, the system is devised to control a condition, customarily, to maintain a condition at some predetermined state or value. By the term condition is here meant any physical or chemical property, characteristic, or state capable of measurement and control, for example, pressure, temperature, flow, rate of combustion, rate of chemical action, or the like. A system of this character comprises broadly a condition-influencing means adjustable by some controlled power means so as to influence in opposite directions the condition being controlled. The power means must of necessity be in part controlled by the condition and to that end the system includes means responsive to the condition, which means indicates the state of the condition and, moreover, does so in terms or in a factor which can be utilized for control of the power means. To predetermine the value or state of the condition to be maintained, manually adjustable means is provided, the manual means and the means responsive to the condition being through suitable coupling or integrating means rendered operative to generate a signal capable of controlling the power means. Inasmuch as there is still some time lag between the call for adjustment of the condition and actual adjustment thereof in accordance with the call, despite the high sensitivity and high speed of operation of present day devices, means is provided herein to compensate for such time lag by anticipating the ultimate change that will be effected in the condition by an adjustment of the condition-influencing means. Such anticipation is herein effected through offsetting the signal calling for adjustment of the condition-influencing means with the offsetting means operating as a function of the length of time of adjustment of the condition-influencing means. Moreover, the offsetting means is rendered but temporarily effective with the removal of the effectiveness being preferably so timed as to be completely terminated simultaneously with the returne of the condition to its predetermined value or state.

In somewhat greater particularity, the offsetting means of the systems disclosed herein employ differential pressures which are initially set up and controlled in accordance with the nature and duration of the signal calling for adjustment of said condition-influencing means, while the rendering ineffective of the offsetting means is accomplished through means permitting controlled equalization of the pressure differentials. The coupling or integrating means, moreover, herein takes the form of a bridge network and may be composed of inductances or resistances, as shown, and conceivably may be other electrical units such as capacitances or combinations of two or more of such electrical units.

Turning now to the form of the invention shown in Fig. 1, the condition to be controlled, as shown by way of exemplary embodiment, is the pressure of a fluid flowing in a conduit 5, the flow of fluid through the conduit being in the direction of the arrow and the conduit being connected to some suitable source of the fluid (not here shown). Influencing the pressure in the conduit 5 is a valve 6 adjustable to various positions by an electric motor 7 operating through suitable linkage, herein diagrammatically shown at 8. Responsive to the pressure in the conduit 5 is a pressure responsive device 9 having a diaphragm 10 therein to which is secured a stem 11 extending outwardly of the casing of the pressure responsive means 9 and carrying at its free end an iron core 12 the function of which will presently be described in greater particularity. Needless to say, the pressure responsive device 9 converts the condition to be controlled, herein pressure, into a value or factor, herein linear movement and position of the core 12, capable of use in generating a signal controlling the motor 7. Complementing the pressure responsive means 9 is a condition value predetermining means, herein taking the form of a simple, manually adjustable, screw element 13 also carrying at its free end an iron core 14.

As above indicated, a bridge network integrating means, generally designated 15, is provided to convert the relative positions of the cores 12 and 14 into a signal controlling the motor 7. Herein the bridge network is a Wheatstone bridge having its legs or sides composed of four inductance coils 16, 17, 18 and 19. A suitable supply voltage source is represented at 20 and is by leads 21 and 22 connected respectively to one end of each of the coils 16 and 17 and to one end of each of the coils 18 and 19. The remaining ends of the coils 16 and 18 are by a lead 23 connected to a control circuit 24 for the motor 7, while similarly connected to the motor control circuit 24 by a lead 25 are the remaining ends of the coils 17 and 19. The motor control circuit 24 may be any one of several common and well known circuits capable of taking the difference in potential, both magnitude and phase, across the leads 23 and 25 and converting the same and frequently also amplifying the same into a signal operable to cause the motor 7 to rotate in the desired direction, either forward or reverse, depending upon the nature of the adustment in the condition that is to be made. The motor control circuit 24 is herein diagrammatically shown connected to the motor 7 through three leads 26, 27 and 28, of which 27 is a common lead, while 26 and 28 are alternately utilized depending upon which direction the motor is to rotate.

Coil 16 of the network is operatively associated with the iron core 12 of the pressure responsive means 9. The core 12 is disposed axially of the coil 16 and thus is operable, depending upon its position, axially of the coil to vary the inductance and hence the voltage drop across the coil. Coil 17 is similarly associated with the core 14 of the manual means 13. Assuming that the coils 18 and 19 are in balance, the coils 16 and 17 will determine the potential at the point in the network to which the leads 23 and 25 are connected. If the manual means 13 and the pressure responsive means 9 are adjusted so that the bridge is in balance and there is no potential difference across the leads 23 and 25 when the condition to be controlled is at the desired value, a departure of the condition from the predetermined value will be indicated by change in the relative position of the cores 12 and 13 and, more particularly, by the appearance of a voltage difference across the leads 23 and 25, the phase of this potential difference will also indicate the direction of departure of the condition.

In order to avoid overadjustment of the valve 6, which normally occurs in systems of this character because of the inevitable time delay between a call for adjustment of the valve means 6 and the final effect on the pressure of the fluid in the conduit 5, means is provided for anticipating the eventual state of the condition and offsetting the call for adjustment generated by the pressure responsive means and thereby arresting adjustment of said valve 6 at an earlier time. This means herein is pressure actuated taking the form of pressure differential means. Naturally and logically this offsetting means is associated with the coils 18 and 19 and thus includes an iron core 30 associated with the coil 18 and an iron core 31 associated with the coil 19, both being supported for movement axially thereof to vary the inductance of the coils. While the arrangement for creating pressure differential, which in turn acts to vary the position of the cores 30 and 31 in their respective coils, may take a variety of forms, it herein takes the form of a closed tubular device 32 arranged to have an upright U-shaped portion 33 which contains a liquid 34 capable of floatingly supporting the cores 30 and 31 within the coils 18 and 19. At the ends of the U-shaped portion 33, and preferably well above any point to which the liquid 34 would rise, the device has hollow enlargements 35 and 36. Within the enlargement 35 is housed a heating coil 37 interposed by leads 38 in the lead 28 connecting the motor control circuit 24 and the motor. Housed in the enlargement 36 is a heating coil 39 interposed by leads 40 in the lead 26.

As the motor 7 is energized to rotate in one direction as, for example, by the flow of current through the lead 26, the heating coil 39 will of course be energized and will expand the gas in the enlargement 36 and thereby build up a pressure greater than the pressure in the enlargement 35. This pressure differential will, of course, cause the liquid 34 to assume different levels in the legs of the U-shaped portion 33 and thus core 31 will be carried downwardly and core 30 carried upwardly, respectively, relative to their coils 18 and 19. Conversely, when the motor 7 rotates in the opposite direction and current flows through the lead 28, the heating coil 37 will be energized with a reversal in the results just above described. Current will flow in one or the other of the coils 37 and 39 so long as the motor 7 is running and hence so long as the valve means 6 is being adjusted. The action of the offsetting means, therefore, is a function of the length of time of adjustment of the valve means 6. It will be understood, of course, that the offsetting means is so arranged that the effect of change in position of the cores 30 and 31, due to the setting up of a pressure differential, tends to counteract or offset the voltage differential which was created by movement of the core 12 due to departure of the pressure in the conduit 5 from the predetermined or desired value.

Since the pressure differentials herein utilized are created through the generation of heat, time alone would eventually again equalize the pressures if the coils 37 and 39 were not again energized. Means is preferably provided, however, for permitting equalization of the pressures at a more rapid rate. To that end, the enlargements 35 and 36 are interconnected by a tube 41 having interposed therein a manually adjustable bleed valve means 42. By the provision of this bleed passage, the pressures are permitted after a desired period of time to equalize and thus the effect of the offsetting means is removed so that its continued presence may not call for adjustment of the valve means 6 in the opposite direction from that in which it has just been adjusted, which would be the case if the effect of the offsetting means were not removed.

While it is believed that the operation of the system will be readily understood from the above, a brief statement of the operation may facilitate understanding and appreciation of the invention. Let it be assumed, therefore, that the system is temporarily in equilibrium, that is, that the pressure in the conduit 5 is at the value desired and predetermined by adjustment of the manual means 13. Under that assumption, if the other elements of the system are properly adjusted, the Wheatstone bridge 15 should be in balance with no potential difference across the leads 23 and 25 and hence with no signal being generated calling for operation of the motor 7. Assume next that, due to a lessening of the demand on the fluid in the conduit 5 or to an increase in the supply, the pressure in the conduit 5 rises. This will through the device 9 move the core 12 downwardly in its coil 16, thereby upsetting the balance of the bridge and causing a signal to be generated calling for adjustment of the valve means 6 in a direction to close the valve. Under this assumption, the motor is controlled through the leads 27 and 28 with the result that the heating coil 37 is energized. As a consequence of the pressure differentials thus set up, the fluid will be forced downwardly in the leg of the U-shaped portion 34 associated with the enlargement 35 and upwardly in the leg associated with the enlargement 36 and, as a result, the core 30 will be carried into the coil 18 just as was the core 12 into its coil 16, while the core 31 will be carried out of its coil 19. After a period of time, the action of the offsetting means will have progressed to the point where the bridge 15 is again in balance, thereby arresting further adjustment of the valve means 6. As the restriction of the flow of fluid past the valve means 6 gradually reduces the pressure in the conduit 5, the pressure differential between the enlargements 35 and 36 is also disappearing for the coil 37 is no longer energized and flow is taking place through the bleed valve means 42. As the pressure in the conduit 5 decreases, the means 9 of course is also responding to such decrease with a lifting of its core 12. In the hypothetical and ideal case, the pressure is restored to its desired value by a single adjustment of the valve means 6 with all parts of the control system coming back to the original state of equilibrium simultaneously. In practice, compensation for a change affecting the pressure in the conduit 5 is effected through a continuing series of progressively smaller adjustments of the valve means 6 until the original equilibrium state is reached with the valve in the new position.

Figure 2:
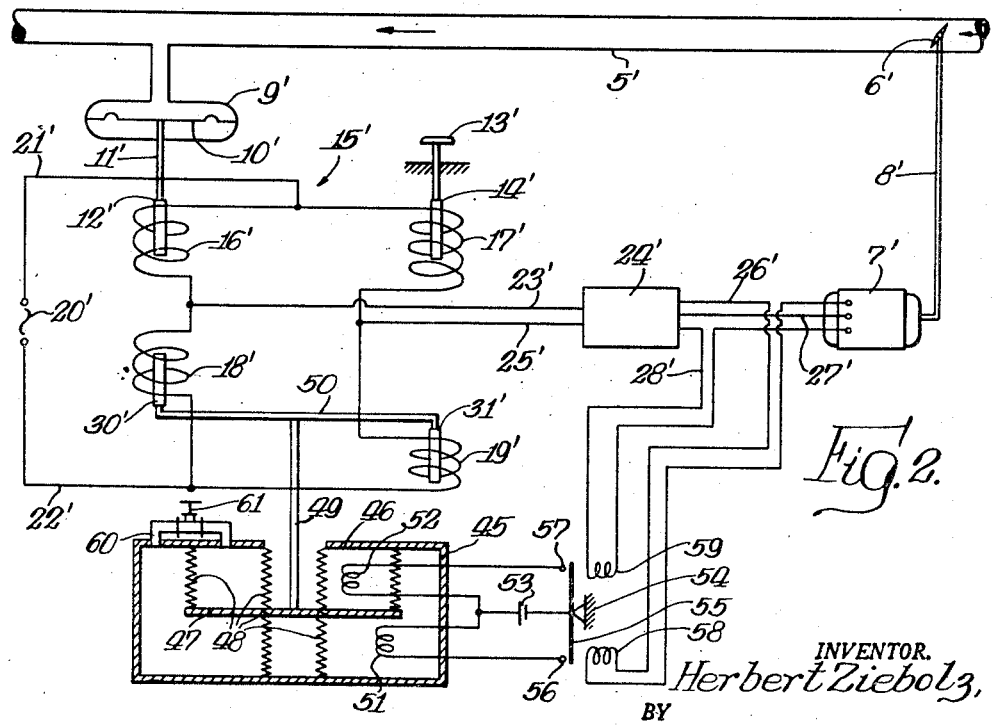
Fig. 2 is a diagrammatic illustration of a modi-

Turning now to the form of the invention shown in Fig. 2, the condition to be controlled is still shown, by way of exemplary embodiment, as the pressure of a fluid flowing in a conduit 5', the flow of fluid through the conduit being in the direction of the arrow and the conduit being connected to some suitable source of the fluid (not here shown). Influencing the pressure in the conduit 5' is a valve 6' adjustable to various positions by an electric motor 7' operating through suitable linkage, herein diagrammatically shown at 8'. Responsive to the pressure in the conduit 5' is a pressure responsive device 9' having a diaphragm 10' therein to which is secured a stem 11', extending outwardly of the casing of the pressure responsive means 9', and carrying at its free end an iron core 12' the function of which will presently be described in greater particularity. Needless to say, the pressure responsive device 9' converts the condition to be controlled, herein pressure, into a value or factor, herein linear movement and position of the core 12', capable of use in generating a signal controlling the motor 7'. Complementing the pressure responsive means 9' is a condition value predetermining means, herein taking the form of a simple, manually adjustable, screw element 13' also carrying at its free end an iron core 14'.

A bridge network integrating means, generally designated 15', is provided to convert the relative positions of the cores 12' and 14' into a signal controlling the motor 7'. Herein the bridge network is a Wheatstone bridge having its legs or sides composed of four inductance coils 16', 17', 18' and 19'. A suitable supply voltage source is represented at 20' and is by leads 21' and 22' connected respectively to one end of each of the coils 16' and 17' and to one end of each of the coils 18' and 19'. The remaining ends of the coils 16' and 18' are by a lead 23' connected to a control circuit 24' for the motor 7', while similarly connected to the motor control circuit 24' by a lead 25' are the remaining ends of the coils 17' and 19'. The motor control circuit 24' may be any one of several common and well known circuits capable of taking the difference in potential, both magnitude and phase, across the leads 23' and 25' and converting the same, and frequently also amplifying the same, into a signal operable to cause the motor 7' to rotate in the desired direction, either forward or reverse, depending upon the nature of the adjustment in the condition that is to be made. The motor control circuit 24' is herein diagrammatically shown connected to the motor 7' through three leads 26', 27' and 28', of which 27' is a common lead, while 26' and 28' are alternately utilized depending upon which direction the motor is to rotate.

Coil 16' of the network is operatively associated with the iron core 12' of the pressure responsive means 9'. The core 12' is disposed axially of the coil 16' and thus is operable, depending upon its position axially of the coil, to vary the inductance and hence the voltage drop across the coil. Coil 17' is similarly associated with the core 14' of the manual means 13'. Assuming that the coils 18' and 19' are in balance, the coils 16' and 17' will determine the potential at the point in the network to which the leads 23' and 25' are connected. If the manual means 13' and the pressure responsive means 9' are adjusted so that the bridge is in balance and there is no potential difference across the leads 23' and 25' when the condition to be controlled is at the desired value, a departure of the condition from the predetermined value will be indicated by difference in the relative position of the cores 12' and 13' and, more particularly, by the appearance of a voltage difference across the leads 23' and 25'. The phase of this potential difference will also indicate the direction of departure of the condition.

As in Fig. 1, means is provided to offset the call for adjustment generated by the pressure responsive means and thereby arrest adjustment of said valve 6' at an earlier time. This means herein also is pressure actuated taking the form of pressure differential means. Naturally and logically this offsetting means is associated with the coils 18' and 19' and thus includes an iron core 30' associated with the coil 18' and an iron core 31' associated with the coil 19', both being supported for movement axially thereof to vary the inductance of the coils. The pressure differential means herein takes the form of two containers 45 and 46 arranged relative to one another so as to have a common wall 47. The containers are generally annular and arranged one within the other with the common wall 47 connected to rigid walls of both containers through bellows-like walls 48 to have a movement axially of the annular containers upon existence of a pressure differential in said containers. Secured at one end to the wall 47 is a rod 49 carrying at its other end a cross bar 50 attached to the cores 30' and 31'. As will readily be seen from an examination of Fig. 2, the cores 30' and 31' enter opposite ends of their respective coils so that movement of the rod 49 in either axial direction will have opposed effects on the cores, that is, to cause the one to enter its coil and to cause the other to be withdrawn from its coil.

Pressure differentials are herein affected in the containers 45 and 46 by variation in the temperature thereof and to that end there is housed in the container 45 a heating coil or element 51 and in the container 46 a coil or element 52. Energy for the heating coils is derived from a suitable source herein shown as a battery 53. The coils are under the control of a switch, generally designated 54, having a pivoted blade 55 having a normal position in which neither coil is energized, and oppositely pivoted positions in which it engages either a stationary contact 56 to complete a circuit for the coil 51 or a stationary contact 57 to complete a circuit for the heating coil 52. The switch is controlled as an incident to energization of the motor 7'. To that end, coils 58 and 59 which serve as solenoids effecting the control of the switch 54 are connected respectively in the leads 26' and 28' leading from the motor control circuit 24' to the motor. It will be apparent from the foregoing that the action of the offsetting means is a function of the length of time of adjustment of the valve means 6'. It will also be appreciated that the offsetting means is so arranged that the effect of change in position of the cores 30' and 31', due to the setting up of a pressure differential, tends to counteract or offset the voltage differential which was created by movement of the core 12' due to departure of the pressure in the conduit 5' from the predetermined or desired value.

Since the pressure differentials herein utilized are created through the generation of heat, time alone would eventually again equalize the pressures if the coils 51 and 52 were not again energized. Means is preferably provided, however, for permitting equalization of the pressures at a more rapid rate. To that end the two containers 45 and 46 are interconnected by a bleed passage 60 having interposed therein a manually adjustable valve 61. By the provision of this bleed passage, the pressures are permitted after a desired period of time to equalize and thus the effect of the offsetting means is removed so that its continued presence may not call for adjustment of the valve means 6' in the opposite direction from that in which it has just been adjusted. The operation of this form of the invention is basically the same as that disclosed in Fig. 1 and it is believed will be readily understood from the foregoing description, particularly when coupled with the previous statement of the operation of the system of Fig. 1.

Turning now to the form of the invention shown in Fig. 3, the condition to be controlled, as shown by way of exemplary embodiment, is the pressure of steam in a boiler 65 supplied with fuel through a conduit 5". Influencing the pressure in the boiler 65 by controlling the fuel supplied thereto is a valve 6" adjustable to various positions by an electric motor 7" operating through suitable linkage, herein diagrammatically shown at 8". Responsive to the pressure in the boiler 65 is a pressure responsive device 66 of the Bourdon type connected to actuate a movable contact 67 the function of which will presently be described in greater particularity. Needless to say, the pressure responsive device 66 converts the condition to be controlled, herein pressure, into a value or factor, herein linear movement and position of the contact 67, capable of use in generating a signal controlling the motor 7". Complementing the pressure responsive means 66 is a condition value predetermining means, herein taking the form of a simple, manually adjustable, screw element 13" also connected to actuate a contact 68.

A bridge network integrating means, generally designated 69, is provided to convert the relative positions of the contacts 67 and 68 into a signal controlling the motor 7". Herein the bridge network is composed of three resistors 70, 71 and 72. A suitable supply voltage source is represented at 73 and is by leads 74 and 75 connected respectively to one end of each of the resistors 70 and 71 and to a third movable contact 76 engaging resistor 72. Contact 67 engages resistor 70 and is by a lead 77 connected to the lead 74. Contact 68 engages resistor 71 and is by a lead 78 also connected to lead 74. Resistor 72 is connected to the remaining ends of the resistors 70 and 71. The juncture of the resistors 70 and 72 and the juncture of the resistors 71 and 72 are respectively connected by leads 79 and 80 to a motor control circuit 24". The motor control circuit 24" may be any one of several common and well known circuits capable of taking the difference in potential, both magnitude and phase, across the leads 79 and 80 and converting the same and frequently also amplifying the same into a signal operable to cause the motor 7'' to rotate in the desired direction, either forward or reverse, depending upon the nature of the adjustment in the condition that is to be made. The motor control circuit 24'' is herein diagrammatically shown connected to the motor 7'' through three leads 26'', 27'' and 28'', of which 27'' is a common lead, while 26'' and 28'' are alternately utilized depending upon which direction the motor is to rotate.

If the contact 76 is at the electrical mid point of resistor 72, the resistors 70 and 71 will determine the potential at the points in the network to which the leads 79 and 80 are connected. If thus the manual means 13'' and the pressure responsive means 66 are adjusted so that the network is in balance and there is no potential difference across the leads 79 and 80 when the condition to be controlled is at the desired value, a departure of the condition from the predetermined value will be indicated by change in the relative position of the contacts 67 and 68 and, more particularly, by the appearance of a voltage difference across the leads 79 and 80. The phase of this potential difference will also indicate the direction of departure of the condition.

In order to avoid overadjustment of the valve 6'', which normally occurs in systems of this character because of the inevitable time delay between a call for adjustment of the valve means 6'' and the final effect on the pressure of the boiler 65, means is provided for anticipating the eventual state of the condition by offsetting the call for adjustment generated by the pressure responsive means and thereby arresting adjustment of said valve 6'' at an earlier time. This means herein also is pressure actuated taking the form of pressure differential means and is associated with the movable contact 76. Herein this pressure differential means takes the form of two containers 81 and 82 arranged relative to one another so as to have a common wall 83. The containers are generally annular and arranged one within the other with the common wall 83 connected to rigid walls of both containers through bellows-like walls 84. With this construction, the wall 83 can partake of a movement axially of the annular containers upon the existence of a pressure differential in the containers. Attached at one end to the wall 83 is a rod 85 which is attached at its other end to the movable contact 76 for movement thereof longitudinally of the resistor 72 as the wall 83 moves.

Pressure differentials are herein set up through the employment of a pump 86 of any one of several suitable types, but here illustrated as a gear pump. One side of the pump 86 is by a conduit 87 connected to the container 81 while the other side of the pump is by a conduit 88 connected to the container 82. The pump is driven from an electric motor 89 through a suitable connection represented diagrammatically at 90. In order that the operation of the offsetting means may still be a function of the length of time of the operation of the motor 7'', that is, the length of time of adjustment of the valve means 6'', the pump motor 89 is connected to be energized whenever and so long as the motor 7'' is energized. To that end, it is by leads 91, 92 and 93 connected to leads 26'', 27'' and 28''. The pump motor 89 thus not only will operate whenever the motor 7'' is operating but will also rotate in a corresponding direction. In order to permit equalization of the pressures in the containers 81 and 82, a by-pass or bleed passage connection 94 is formed between the conduits 87 and 88. Incorporated in this connection is a manually adjustable bleed valve 95.

The operation of the system disclosed in this form of the invention is basically the same as that of the form disclosed in Fig. 1. It is believed, therefore, that operation of this form of the invention will be clearly and readily understood from the foregoing description coupled with the résumé of the operation of the invention disclosed in Fig. 1. Suffice it to say, therefore, that the features of this invention are the provision of a network the balance of which is influenced by three factors, a manual adjustment predetermining the value of the condition to be maintained, means responsive to the condition as it actually exists, and means for anticipating the final effect on the condition of adjustment of the valve means 6'' and brought into play to offset the call for adjustment of the valve means so as to arrest such adjustment and prevent the overadjustment which is so common. This offsetting means herein operates as a function of the time of adjustment of the valve means and takes the form of a pressure differential device. Means is provided in all instances permitting gradual restoration of the pressure differentials to a balanced pressure condition and as a consequence removal of the offsetting effect of the offsetting means.

I claim as my invention:

1. A system for controlling a condition comprising, in combination, adjustable condition influencing means, power means for adjusting said condition influencing means, an electrical control circuit for said power means, and means for generating a signal to which said control circuit is responsive comprising a resistance network having a first leg including a resistor and a manually adjustable element associated with the resistor adjustable to predetermine the value of the condition to be maintained, a second leg including a resistor and a contact movable therealong to determine the effective value thereof, a device responsive to the condition to be maintained connected to move said contact, resistance means completing said network including an adjustable device for influencing the balance of the network, means responsive to an unbalance of said network to cause actuation of said power means in one direction or the other depending upon the direction of unbalance of said network, means operable upon unbalance of said network in one direction or the other to activate said adjustable device to tend to restore the balance of said bridge, and means for gradually removing the influence of said last mentioned means.

2. A system for controlling a condition comprising, in combination, adjustable condition influencing means, power means for adjusting said condition influencing means, an electrical control circuit for said power means, a normally balanced network the unbalance and the direction of unbalance of which constitutes a signal to which said control circuit is responsive comprising a first, a second and a third resistor, said first and second resistors having contacts movable therealong to determine the effective value of the resistors connected in said network, a source of potential for said network having a common connection to one end of each of said first and second resistors and a connection through a movable contact to said third resistor and uninterrupted leads connecting the juncture points of said first and second resistors with said third resistor to said electrical control circuit, manual means for adjusting said first resistor to predetermine the value of the condition to be maintained, means responsive to the condition adjusting said second resistor in accordance with the condition, means operable as an incident to and for the duration of actuation of said power means to adjust said third resistor to tend to restore balance to said network, and means for removing the influence of said last named means.

3. A system for controlling a condition comprising, in combination, adjustable condition influencing means, power means for adjusting said condition influencing means, means responsive to the condition indicating variation in the value of the condition, a manual device adjustable to predetermine the value of the condition to be maintained, means including said manually adjustable device and said means responsive to the condition operable upon departure of the condition from the predetermined value to generate a signal calling for adjustment of said condition influencing means in one direction or the other depending upon the direction of departure of the condition from the predetermined value, and means operable to offset the call for adjustment of said condition influencing means including chambered pressure means operable in response to an increasing pressure differential to offset the call for adjustment of said condition influencing means to an increasing extent, and a pump associated with said pressure means operable to draw fluid from one chamber and supply it to another to create a pressure differential, said pump operating during the periods of energization of said power means.

4. A system for controlling a condition comprising, in combination, adjustable condition influencing means, power means for adjusting said condition influencing means, means responsive to the condition indicating variation in the value of the condition, a manual device adjustable to predetermine the value of the condition to be maintained, means including said manually adjustable device and said means responsive to the condition operable upon departure of the condition from the predetermined value to generate a signal calling for adjustment of said condition influencing means in one direction or the other depending upon the direction of departure of the condition from the predetermined value, and means operable to offset the call for adjustment of said condition influencing means including a pair of containers having a common wall mounted for movement upon creation of a pressure differential within said containers, conduits forming a closed circuit with said containers, a pump associated with said closed circuit and functioning upon operation to create a pressure differential between said containers, a motor for driving said pump connected to be energized simultaneously and in the same manner as said power means, and a by-pass connection between said conduits including a manually adjustable valve for determining the rate of equalization of the pressures in said containers when said pump is not in operation.

HERBERT ZIEBOLZ.

REFERENCES CITED

The following references are of record in the file of this patent:

UNITED STATES PATENTS

| Number | Name | Date |
|---|---|---|
| 2,208,559 | Baak | July 23, 1940 |
| 2,228,336 | Annin | Jan. 14, 1941 |
| 2,317,807 | Ryder | Apr. 27, 1943 |
| 2,325,103 | Bristol | July 27, 1943 |
| 2,335,943 | Jones | Dec. 7, 1943 |
| 2,403,917 | Gille | July 16, 1946 |

FOREIGN PATENTS

| Number | Country | Date |
|---|---|---|
| 444,673 | Great Britain | Mar. 25, 1936 |